United States Patent [19]

Gerulis

[11] Patent Number: 4,897,186
[45] Date of Patent: Jan. 30, 1990

[54] FLUID FILTER

[75] Inventor: Benedict R. Gerulis, Blaine, Minn.

[73] Assignee: C.I.B., Inc., Minneapolis, Minn.

[21] Appl. No.: 322,644

[22] Filed: Mar. 13, 1989

Related U.S. Application Data

[63] Continuation of Ser. No. 160,552, Feb. 26, 1988, Pat. No. 4,812,230.

[51] Int. Cl.$^4$ .................................................. B01D 27/12
[52] U.S. Cl. ................................... 210/108; 210/111; 210/441; 210/444; 210/DIG. 17
[58] Field of Search ............... 210/106, 108, 111, 115, 210/116, 131, 411, 444, DIG. 17, 791, 798, 117, 137, 437

[56] References Cited

U.S. PATENT DOCUMENTS

| | | | |
|---|---|---|---|
| 2,024,753 | 12/1935 | Zwicky | 210/106 |
| 2,366,112 | 12/1944 | Jokel | 210/106 |
| 2,475,968 | 7/1949 | Jokel | 210/106 |
| 2,743,018 | 4/1956 | Belgarde | 210/183 |
| 3,017,029 | 1/1962 | Berninger | 210/108 |
| 3,044,475 | 7/1962 | Thompson | 210/DIG. 17 |
| 3,224,585 | 12/1965 | Scavuzzo et al. | 210/232 |
| 3,235,085 | 2/1966 | Humbert, Jr. | 210/130 |
| 3,557,957 | 1/1971 | Baldwin | 210/130 |
| 3,608,722 | 9/1971 | Picard | 210/108 |
| 3,717,252 | 2/1973 | Picard | 210/108 |
| 3,853,762 | 12/1974 | Moatti | 210/108 |
| 3,944,488 | 3/1976 | Moatti | 210/108 |
| 4,028,243 | 6/1977 | Offer et al. | 210/130 |
| 4,090,962 | 5/1978 | Braukmann | 210/108 |
| 4,268,384 | 4/1981 | Rosaen et al. | 210/133 |
| 4,295,963 | 10/1981 | Drori | 210/108 |
| 4,549,961 | 10/1985 | Bellemann et al. | 210/108 |
| 4,581,135 | 4/1986 | Gerulis | 210/108 |
| 4,645,591 | 2/1987 | Gerulis | 210/108 |
| 4,812,230 | 3/1989 | Gerulis | 210/108 |

FOREIGN PATENT DOCUMENTS 819179 10/1951 Fed. Rep. of Germany .
2249526 5/1975 France ........................... 210/108

Primary Examiner—Robert Spitzer
Attorney, Agent, or Firm—Peterson, Wicks, Nemer & Kamrath

[57] ABSTRACT

An improved self-cleaning fluid filter (10) is disclosed having a housing (12) with spaced inlet and outlet ports (14, 16) formed in a common wall (18) of the housing (12). The filter (10) further includes a first sleeve (48) extending from the housing's common wall (18) in which the outlet port (16) is formed. An interior chamber within the first sleeve (48) communicates with the outlet port (16), and the first sleeve (48) has a narrowed portion (52) proximate the outlet port (16). The narrowed portion (52) of the first sleeve (48) has at least one orifice (102) formed therein. The filter (10) further includes a second sleeve (60) extending from the common wall (18) and generally concentrically encircling an axial portion of the narrowed portion (52) of the first sleeve (48). A generally annular space (72) is, thereby, defined between the first and second sleeves (48, 60). A generally cylindrical filter cartridge (62) encircles an expanded portion (54) of the first sleeve (48) and is disposed for telescoping movement relative thereto. The filter cartridge (62) is normally biased to a primary position thereof wherein a piston surface (66) forming a part of the filter cartridge (62) occludes the annular space (72). The inlet port (14) communicates with the space (72). The filter (10) further includes a valve member (90) received within the first sleeve (48) and disposed for axial movement relative thereto. The valve member (90) moves relative to the first sleeve (48) in response to fluid flow inducing a pressure upon a diaphragm piston (92) to which it is interconnected.

31 Claims, 2 Drawing Sheets

FLUID FILTER

CROSS REFERENCE

This application is a continuation of application Ser. No. 160,652 filed Feb. 26, 1988, now U.S. Pat. No. 4,812,230.

TECHNICAL FIELD

The present invention deals broadly with the field of fluid filtration. More specifically, however, the invention deals with a fluid filter wherein the filter medium is automatically purged of particulate contaminants each time fluid under pressure is initially introduced through an inlet port to the filter. A preferred embodiment of the invention is particularly appropriate for use with systems such as water systems wherein constant pressure can be provided to the system eve when contaminants are purged from the filter housing.

BACKGROUND OF THE INVENTION

Various types of filtration devices are known and employed in the filter industry. Canister-type filters are, typically, used for removing particulate matter from lubricating oils in vehicles and other machinery. Such filters are attached to the vehicle or machine to continuously filter the oil while the machine is operating.

Canister-type filters which are used on motor vehicle engines, while being able to operate satisfactorily for a period of time, lose efficiency as time passes and particulate matter builds up on the filter medium. They must, therefore, be discarded and replaced after approximately 100 to 300 hours of use.

Canister-type filters can also be employed for filtration of particulate matter from water. Such filters can be used in homes and industry for removing sand, grit, rust, and water treatment chemicals from water supplies. Use of such filters is particularly appropriate in rural homes where the water supply has a high concentrate of particulate deposits.

Again, however, the useful life of the filter is limited by the rate at which clogging occurs. As clogging increases, the pressure drop across the filter medium increases commensurately.

A significant problem in the filtration industry has, therefore, been this residual build-up of filtered particulates on the filter medium. Because of the typical surface area of filtration medium elements, little storage capacity is afforded. A relatively short component life, thereby, results.

One solution which has been attempted and which has gone far to resolving these problems is a self-cleaning fluid filter as disclosed in Applicant's prior patent, U.S. Pat. No. 4,645,591, which issued on Feb. 24, 1987. The device of that document, while being able to filter various fluids, was particularly intended for use in vehicle lubrication system filtration. The canister housing of the filter device disclosed in that document employed means for mating the filter with a nipple of the face of the engine with which it is intended to be used.

As previously indicated, that invention was a significant advance over the prior art. The housing defined a sump into which particulate build-up on the filter medium, purged during initial start-up of the engine, was deposited. Consequently, the problem of the limited surface area of the filter medium was overcome. this, in turn, extended the use of the filter.

Still, however, the life of the filter was limited, although to a lesser extent than in prior art devices, because of the limited capacity of the sump. While the presence of the sump significantly multiplies useful life of a device constructed in accordance with that patent, eventually, the sump becomes filled, and the filter canister must be discarded.

Additionally, the particular design employed in the device illustrated in that patent was relatively complicated in operation. Further, the filter illustrated in that document provided certain safeguards which are, typically, necessary in a filtration system such as in a motor vehicle. In a constant pressure system, such as a water supply of a municipality, certain of those safeguards are unnecessary.

The present invention is an improvement over prior art filters including Applicant's invention as disclosed in his U.S. Pat. No. 4,645,591. It provides a filtration mechanism which is simple in both its construction and operation. Additionally, however, it provides a filter which has a virtually unlimited operational life.

SUMMARY OF THE INVENTION

The present invention is a self-cleaning fluid filter which includes a housing. One wall of the housing has both fluid inlet and outlet ports formed therein. These ports are to afford ingress and egress, respectively, of a pressurized fluid.

A first sleeve is disposed within the housing and extends from the wall in which the inlet and outlet ports are commonly formed. The sleeve has an interior chamber which is in fluid communication with the outlet port. The sleeve comprises two sections: a narrowed portion immediately proximate the outlet port, and an expanded portion which is remote from the outlet port. The narrowed portion is provided with at least one orifice formed therein.

The filter further includes a second sleeve which also extends from the common wall of the housing. The second sleeve generally concentrically encircles an axial length of the narrowed portion of the first sleeve. An annular space, in fluid communication with the inlet port, is, thereby, defined between the first and second sleeves. The second sleeve has a distal end which is spaced axially from the common wall toward the expanded portion of the first sleeve.

A generally cylindrical filter cartridge is received within the housing to encircle the expanded portion of the first sleeve. The filter cartridge is disposed for telescoping movement relative to that expanded portion of the first sleeve. Movement of the filter cartridge occurs in response to the introduction and termination of flow of the pressurized fluid through the inlet port. An end of the filter cartridge most closely proximate the wall in which the inlet port is formed carries a piston surface. The piston surface is, when the filter cartridge is in a primary position thereof, received within the annual space and occludes flow of fluid being introduced to the filter, through the inlet port, beyond the piston surface. The fluid, however, drives the piston surface away from the wall in which the inlet port is formed to urge the filter cartridge to a secondary position, wherein the piston surface has exited the annular space and is disposed axially between the distal end of the second sleeve and the orifice or orifices formed in the narrowed portion of the first sleeve.

Means, such as a coil spring, are provided for biasing the filter cartridge to its primary position wherein the piston surface carried by the cartridge occludes fluid flow through the annular space and away from the wall in which the inlet port is formed. The normal, primary position of the cartridge is one wherein the piston surface carried thereby is received within the annular space between the first and second sleeves.

The filter includes a valve member which is received within the narrowed portion of the first sleeve. In a preferred embodiment, the valve member is sleeve-like in construction.

The valve member is disposed within the narrowed portion of the first sleeve for reciprocal movement relative thereto. The valve member is disposed for movement between a primary position, wherein the valve member occludes the orifice or orifices formed in the first sleeve, and a secondary position, spaced axially from the primary position of the valve member, wherein the orifice or orifices are unobstructed.

Finally, the invention includes means for urging the valve member between its primary and secondary positions. The valve member normally occupies its primary position, and the urging means urge the valve member to its secondary position. As fluid flow is introduced through the inlet port, the filter cartridge is moved from its primary position to its secondary position. The urging means, further, urges the valve member from its secondary position, wherein the orifice or orifices are unobstructed, back to its primary position as fluid flow through the inlet port is discontinued to allow the filter cartridge biasing means to urge the filter cartridge from its secondary position back to its primary position.

In the preferred embodiment, the valve member urging means comprises a diaphragm piston received within the expanded portion of the first sleeve. The diaphragm piston is operatively connected to the valve member so that, as the diaphragm piston is reciprocated within the expanded portion of the first sleeve, the valve member will be reciprocated commensurately within the narrowed portion of the first sleeve.

As fluid is introduced through the inlet port into the annular space, the piston surface carried by the filter cartridge is driven away from the wall in which the inlet port is formed and past the distal end of the second sleeve. The diaphragm piston then becomes exposed to pressure from the fluid entering the inlet port. As pressure is brought to bear upon the diaphragm piston, it will be driven axially to drive, in turn, the valve member axially away from its position occluding the orifice or orifices in the first sleeve narrowed portion.

When fluid flow through the inlet port is terminated, the cartridge member will return to its primary position, and pressure will not be continuously exerted upon the diaphragm piston received within the expanded portion of the first sleeve. The urging or biasing means can be provided to engage either the valve member or the diaphragm piston operatively connected to the valve member. When pressure on the diaphragm piston connected to the valve member is terminated, the valve member will, therefore, be returned to its primary position occluding the orifice or orifices in the first sleeve.

The preferred embodiment of the invention also includes structure whereby a sump within the housing can be purged, at intervals, of particulate matter which has been scoured from the surface of the filter medium carried by the filter cartridge. The purging means comprises a scavenger valve having a spool member disposed for reciprocation through a scavenger port. The spool is operatively connected to the valve member and moves reciprocally therewith.

When the valve member is in its primary position, the spool is disposed so that a primary, annular land thereof is in a position occluding the scavenger port in the housing. As the valve member, however, is urged toward its second position, a narrowed diameter portion of the spool is axially coextensive with the scavenger port, the primary land having become unseated. With the spool in this position as the valve member transits to its second position, fluid in the sump and particulate matter carried thereby are purged from the filter housing.

As operation of the filter is continued, a secondary annular land becomes axially coextensive with the scavenger port. This land, as in the case of the primary land, has a diameter and sealing means so that, when it is so axially coextensive with a scavenger port, it precludes flow therethrough. As will be able to be seen then, in view of this disclosure, as the spool is drawn reciprocally by the valve member, purging of the sump will be occasioned only during the transit of the spool as the valve member moves between its primary and secondary positions. During both a static status and full operation of the filter, the scavenger port will be occluded, and purging of fluid therethrough will be precluded.

The present invention is thus an improved self-cleaning fluid filter. More specific features and advantages obtained in those features will become apparent with reference to the Detailed Description of the Invention, appended claims, and accompanying drawing figures.

DETAILED DESCRIPTION OF THE INVENTION

Figure 1:
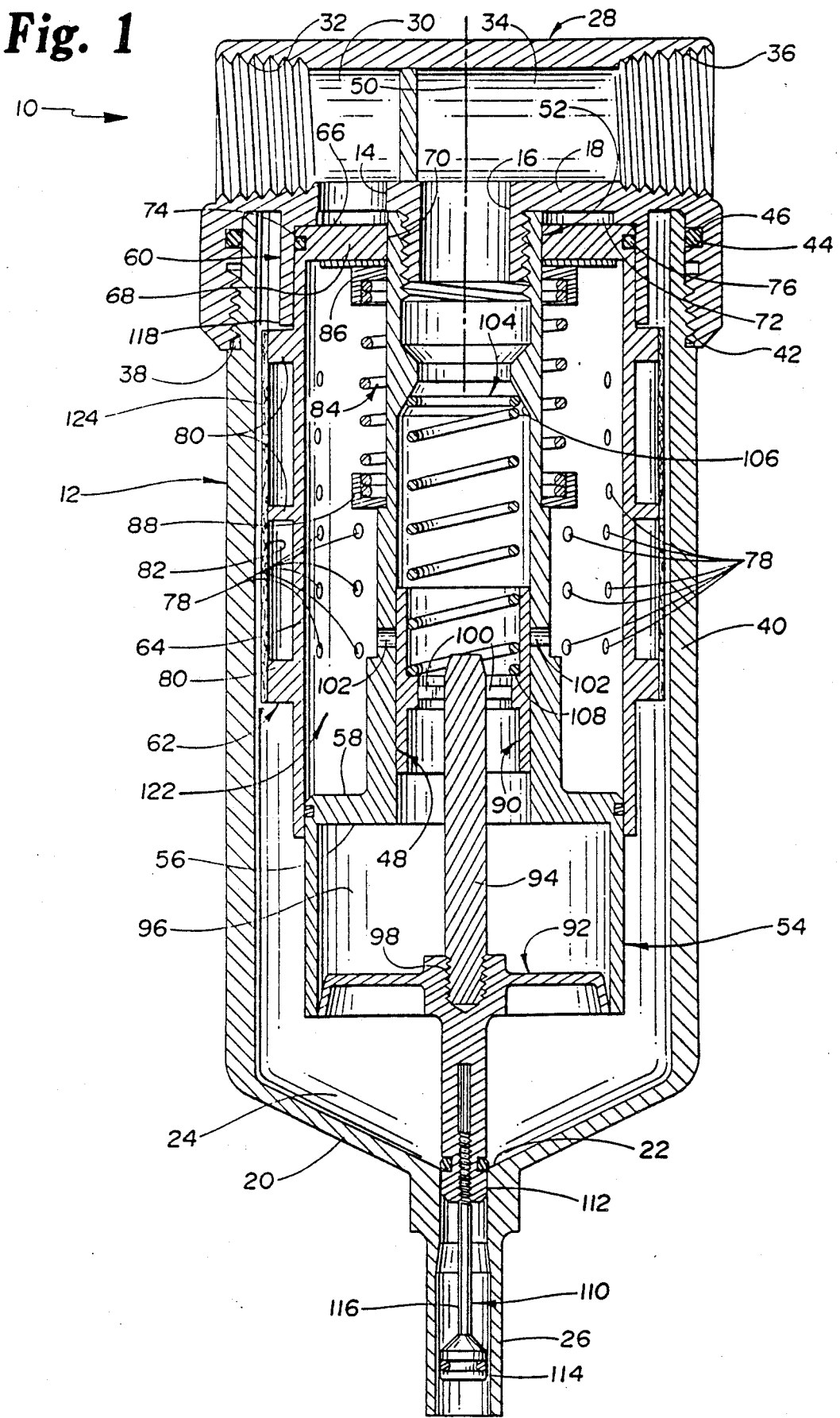
FIG. 1 is a sectional, side elevational view of the present invention with the disposition of the parts illustrated as during a static status.

Referring now to the drawings wherein like reference numerals denote like elements throughout the several views, the figures illustrate a filter 10 in accordance with the present invention. The filter 10, as shown, employs a generally circularly cylindrical canister housing 12 which encloses the various operational components. While not essential to the operation of the invention, the filter 10 would typically be oriented as shown in the figures. That is, an end of the filter 10 including inlet and outlet ports 14, 16 would be disposed at the top. Further definition of the invention will, therefore, be made with reference to this orientation.

The filter housing 12 is further defined by an upper closure wall 18 having the inlet and outlet ports 14, 16 formed therein, and a lower conical wall 20 having a scavenger port 22 formed therein. The scavenger port 22 provides fluid communication between a sump 24 in the lower section of the housing 12 and a conduit 26 leading to a drain (not shown).

The upper closure wall 18 of the housing 12 can be integrally formed with a fitting 28, generally disk-like in configuration, which provides passage for fluid to be introduced into the filter 10 and be evacuated therefrom.

The disk-like fitting 28 is shown as including a generally radially extending passage 30 which is in fluid communication with the inlet port 14. The passage 30 is, at its radially outward end (as at 32), internally threaded so that it can be mated with a hose or tube (not shown) providing the source of fluid to be filtered.

Similarly, a passage 34 extending radially in an opposite direction is in fluid communication with the outlet port 16. This passage 34 provides fluid flow from the outlet port 16 to a hose or other type of conduit to which the fluid is to be channelled. Again, a radially outward end of the passage (as at 36) can be internally threaded to afford mating facility.

An assembly of the upper closure wall 18 of the housing 12 and the disk-like fitting 28 can be provided with threads 38 so that the assembly can be tightened onto the cylindrical side wall 40 of the housing 12. Corresponding external threads 42 on the outer surface of the cylindrical side wall 40 would, of course, be provided. An 0-ring seal 44 can be received within a recess 46 in the assembly to provide a seal between the cylindrical side wall 40 of the housing 12 and the assembly.

A first sleeve 48 is shown as extending downwardly from the upper closure wall 18 of the housing 12. The first sleeve 48 is shown as being aligned along an axis 50 of the housing 12, and it is in fluid communication with the outlet port 16.

The first sleeve 48 is fixed within the housing 12, and therefore, has no axial movement relative to the housing 12. The first sleeve 48 has a narrowed portion 52 which extends immediately from the upper closure wall 18. Additionally, it has an expanded portion 54 which is remote from the upper closure wall 18. Inner and outer shoulders 56, 58 are, thereby, defined.

A second sleeve 60 also extends from the upper closure wall 18 of the housing 12. This sleeve 60 encircles, and is generally concentric with respect to, the first sleeve 48. The second sleeve 60, however, is significantly shorter than the first sleeve 48 for a reason as will be discussed hereinafter.

A filter cartridge 62 concentrically encircles the first sleeve 48, and a substantially rigid tubular portion 64 of the filter cartridge 62 has an inside diameter substantially the same as the outside diameter of the expanded portion 54 of the first sleeve 48. Consequently, as the filter cartridge 62 reciprocates axially relative to the first sleeve 48 in a fashion as will be discussed hereinafter, the expanded portion 54 of the first sleeve 48 functions as a guide for the filter cartridge 62.

At the same time, the second sleeve 60 also functions as a guide for the filter cartridge 62. In the case of the second sleeve 60, however, support is exerted radially inwardly upon the filter cartridge 62 by the encircling second sleeve 60.

A piston surface 66 comprises the upper wall 68 of the filter cartridge 62, and the piston surface wall 68 has a central aperture 70 therethrough to accommodate the narrowed portion 52 of the first sleeve 48. As will be able to be seen then, in view of this disclosure, the narrowed portion 52 of the first sleeve 48 also serves a guiding function for the filter cartridge 62.

The piston surface 66 of the upper wall 68 of the filter cartridge 62 is sized and configured so that it completely occludes the annular space 72 defined between the second sleeve 60 and the narrowed portion 52 of the first sleeve 48, when the filter cartridge 62 is received within that annular space 72. Consequently, fluid introduced through the inlet port 14 will be brought to bear upon the piston surface 66 of the filter cartridge 62 and will drive the filter cartridge 62 downwardly. An O-ring seal 74 can be carried within a recess 76 formed in the filter cartridge 62 to ensure a seal between the cartridge 62 and the second sleeve 60 while the cartridge 62 is within the annular space 72.

As seen in the figures, the tubular portion 64 of the filter cartridge 62 is provided with a plurality of apertures 78. The apertures 78 are spaced both axially and circumferentially about the tubular portion 64.

In the preferred embodiment, the filter cartridge 62 employs a plurality of annular supports 80 which space a filter medium 82 radially outwardly from the tubular portion 64. The apertures 78 provided in the tubular portion 64 are disposed so that they underlie the filter medium 82. Consequently, fluid flow through the filter cartridge 62 will be accomplished by allowing passage of the fluid through the apertures 78 and the filter medium 82.

Figure 2:
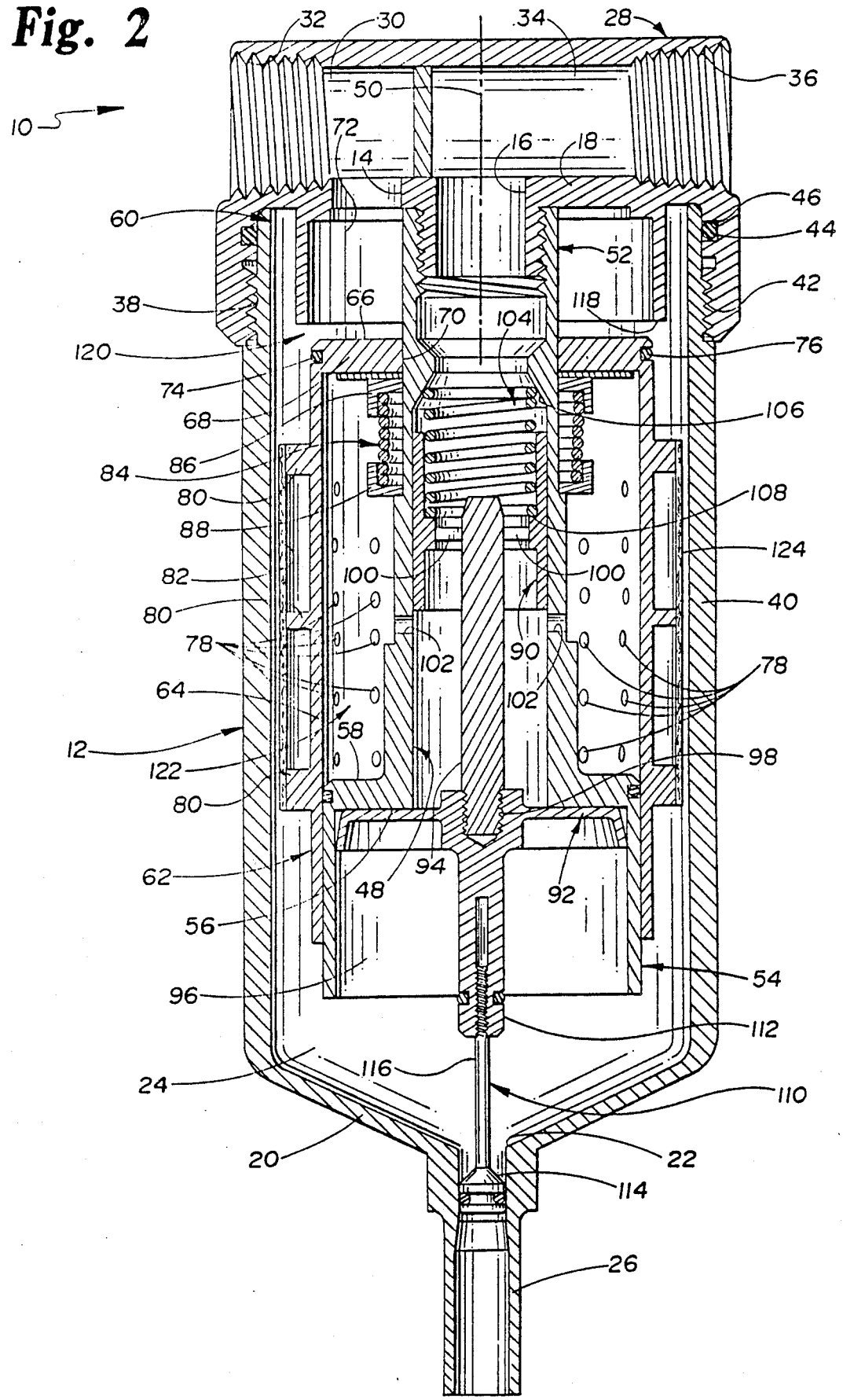
FIG. 2 is a view similar to FIG. 1 but illustrating the various components in the positions they occupy during full operation of the filter.

The filter cartridge 62 is disposed for movement between a primary position, illustrated in FIG. 1, and a secondary position, illustrated in FIG. 2. In the preferred embodiment, a coil spring 84 is provided to bias the filter cartridge 62 to the primary position. As seen in the figures, a generally annular spring retainer 86 can be carried by the filter cartridge 62 to engage and retain therein an upper end of the coil spring 84. A similar spring retainer 88 can be fixedly carried at a defined axial location along the narrowed portion 52 of the first sleeve 48 to engage and retain therewithin the opposite end of the coil spring 84.

A valve member 90 is slideably disposed within the narrowed portion 52 of the first sleeve 48 for axial movement relative thereto. The valve member 90, in the preferred embodiment, is sleeve-like in configuration.

A diaphragm piston 92 is disposed within the expanded portion 54 of the first sleeve 48 for relative movement therewithin. The diaphragm piston 92 is, in turn, interconnected to the valve member 90 by a post 94 extending axially within the chamber 96 defined by the first sleeve 48. The post 94, as seen in the figures, can be mated to the diaphragm piston 92 by appropriate threading (as at 98), and to the valve member 90 by one or more generally radially extending struts 100. It should be pointed out, however, that, whatever means are employed for mating the post 94 to the valve member 90, axial fluid flow along the post 94 particularly at its axial point of connection to the valve member 90 should not be precluded. This is for a reason as will be pointed out hereinafter.

The narrowed portion 52 of the first sleeve 48 includes at least one orifice 102 formed therethrough. Typically, however, a plurality of circumferentially spaced orifices would be provided. In the preferred embodiment, the circumferentially spaced orifices 102 would be at a common axial location along the narrowed portion 52 of the sleeve 48.

FIG. 1 illustrates the valve member 90 in a primary position thereof. With the valve member 90 in this position, the orifices 102 are occluded to prevent fluid flow therethrough. FIG. 2 illustrates the valve member 90 in a secondary position wherein fluid flow through the orifices 102 is unobstructed.

A second coil spring 104 is employed for biasing the valve member 90 to its primary position. The primary position is the one the valve member 90 would occupy when fluid is not introduced into the filter 10 through the inlet port 14. One end of this biasing spring 104 (that is, an upper end) can engage a shoulder 106 defined by a constriction in the passage through the narrowed portion 52 of the first sleeve 48. The other end can engage a shoulder 108 on the inner surface of the valve member 90 at an axial location at which the struts 100 mate the valve member 90 to the post 94.

As shown in the figures, the post 94 can be made to extend downwardly from the diaphragm piston 92 to define a scavenger valve spool 110. The spool 110 includes a primary annular land 112 and a secondary annular land 114. A narrowed diameter portion 116 of the spool 110 is provided between the primary and secondary lands 112, 114. Each land is provided with a diameter such that, when it is axially adjacent the scavenger port 22, it will, in combination with an O-ring seal carried thereby, occlude fluid flow through the scavenger port 22. As the valve member 90 traverses from its primary to its secondary position, however, the spool 110 will be moved so that the primary land 112 will become unseated from the scavenger port 22 and the secondary land 114 will become seated in the scavenger port 22. During the transit, however, the narrowed diameter portion 116 of the spool 110 will be coextensive with the scavenger port 22, and fluid flow through the scavenger port 22 will be permitted.

The figures show the lands 112, 114 as being adjustable axially toward and away from one another. Similarly, the diaphragm piston 92 can be adjusted axially along the post 94. In view of these adjustability features, fine tuning of the filter 10 and its scavenger feature can be effected.

As previously discussed, O-ring seals can be employed at various locations as indicated. Additionally, such seals can be included at other interfaces such as the one between the expanded portion 54 of the first sleeve 48 and the filter cartridge 62. Such seals, in fact, can be introduced at any location at which sealing must be effected.

OPERATION

When the filter 10 illustrated in the figures is initially installed, fluid can be introduced through the inlet port 14 to flood the filter 10. This will occur as a result of the pressurized fluid driving the filter cartridge piston surface 66 downwardly to a point at which the piston surface 66 has escaped the annular space 72 between the second sleeve 60 and the narrowed portion 52 of the first sleeve 48. This is a position as seen in FIG. 2. The position of the filter cartridge 62 as seen in FIG. 1 is defined as the primary position, and the position of the filter cartridge 62 as illustrated in FIG. 2 is defined as the secondary position.

As the filter cartridge 62 moves downwardly and the piston surface 66 thereof moves axially below the distal end 118 of the second sleeve 60, fluid will be permitted to flow radially outwardly through an annular escapement slot 120 which will be defined between the piston surface 66 of the filter cartridge 62 and the distal end 118 of the second sleeve 60. Fluid will pass downwardly along the filter medium 82 and fill the sump 24 in the bottom of the filter housing 12. Once the housing sump 24 becomes filled, fluid will pass inwardly through the filter medium 82 and through the apertures 78 in the tubular portion 64 of the filter cartridge 62. A chamber 122 defined within the tubular portion 64 then becomes filled, and pressure will increase within the sump 24 to drive the diaphragm piston 92 upwardly until it engages the first sleeve inner shoulder 56. Once the valve member 90 moves axially relative to the narrowed portion 52 of the first sleeve 48 to a position at which the orifices 102 become exposed, flow will pass inwardly through the narrowed portion 52 of the first sleeve 48 and outwardly through the outlet port 16 in the upper closure wall 18 of the filter housing 12.

When pressure to the filter 10 is discontinued, the housing 12 will remain flooded. During subsequent operations, particulate materials and other contaminants entrained within the fluid will build up on the outer surface 124 of the filter medium 82 as fluid passes radially inwardly through the filter medium 82.

As will be able to be seen, however, in view of this disclosure, the tubular member 64 of the filter cartridge 62, in combination with the piston surface wall 68 of the cartridge 62 and the outer shoulder 58 defined by the first sleeve 48, defines chamber 122 contained by those members. When pressure and introduction of fluid through the inlet port 14 have been terminated after a previous operation, the valve member 90 will be in its primary position occluding the orifices 102 in the narrowed portion 52 of the first sleeve 48.

As fluid is reintroduced into the filter 10 through the inlet port 14, therefore, fluid within this chamber 122 will become compressed as a result of the chamber size being decreased as the filter cartridge 62 moves downwardly. The piston wall 68 of the cartridge 62 approaches the outer shoulder 58 defined by the first sleeve 48, and the net volume of the chamber 122 is reduced. Consequently, the pressure within the chamber 122 will be increased and will have the effect of purging the filter medium 82 of contaminants which have become deposited on the outer surface 124 thereof.

As the piston surface 66 is continued to be urged downwardly and the piston surface 66 passes the distal end 118 of the second sleeve 60, the escapement slot 120 becomes existent, and fluid flows radially outwardly therethrough. The flow continues downwardly along the filter medium surface 124, and scouring of the surface 124 is accomplished. The contaminants, in view of the direction of the flow of the fluid are deposited within the sump 24.

The increased pressure in the sump 24 will then drive the diaphragm piston 92 upwardly. The valve member 90 is, commensurately, urged upwardly to expose the orifices 102 in the narrowed portion 52 of the first sleeve 48. As this occurs, normal filtration will occur, fluid flowing radially inwardly through the medium 82, through the apertures 78 in the rigid, tubular portion 64 of the filter cartridge 62, through the orifices 102 in the narrowed portion 52 of the first sleeve 48, and outwardly through the outlet port 16. Normal operation will continue as long as pressurized fluid is introduced at the inlet port 14.

As each new cycle is initiated, as the valve member 90 is driven upwardly, the primary land 112 will become lifted from its seat at the scavenger port 22. Contaminants in the sump 24 from the immediately previous operation or a number of previous operations will be allowed to pass downwardly through the scavenger port 22 as the narrowed diameter portion 116 of the spool 110 passes the port 22. Once the secondary position of the valve member 90 is achieved, the secondary land 114 will engage and seat at the scavenger port 22 so that pressure within the filter 10 can be maintained. As will be able to be seen, in view of this disclosure, purging of contaminants in the sump 24 can also be accomplished during movement of the valve member 90 from its secondary position back to its primary position, when pressurized fluid is terminated, in view of the narrowed diameter portion 116 of the spool 110 passing the scavenger port 22.

As previously mentioned, the axial distance between the lands 112, 114 can be varied. Optimum positioning can, thereby, be obtained so that desired pressurization of the fluid system can be maintained.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. Self-cleaning filter including a filter medium between an inlet port for introducing fluid to be filtered and an outlet port for discharging filtered fluid, with the filter medium located in a housing defining a sump, comprising, in combination: means for purging fluid and particulate matter filtered by the filter medium from the sump upon reintroduction of fluid into the inlet port after the flow of fluid has been interrupted and for occluding fluid flow from the sump when the housing has been pressurized by the fluid introduced into the inlet port.

2. The self-cleaning filter of claim 1 wherein the purging and occluding means further comprises means for occluding fluid flow from the sump when the flow of fluid into the inlet port has been terminated such that the housing remains flooded with fluid.

3. The self-cleaning filter of claim 2 further comprising in combination: means for retaining residual filtered fluid on the downstream side of the filter medium during interruption of flow of fluid to be filtered into the inlet port and for backflowing the residual filtered fluid from the downstream side to the upstream side of the filter medium in response to subsequent reintroduction of flow of fluid to be filtered into the inlet port to loosen particulate matter from the upstream side of the filter medium.

4. The self-cleaning filter of claim 3 wherein the retaining and backflowing means includes first means for delaying the initiation of flow of fluid to be filtered to the upstream side of the filter medium to allow the residual filtered fluid to flow away from the filter medium into the sump.

5. The self-cleaning filter of claim 4 further comprising, in combination: second means for delaying flow from the filter medium to the outlet port.

6. The self-cleaning filter of claim 5 wherein the sump includes a scavenger port, and wherein the purging and occluding means comprises, in combination: a scavenger valve including a first land and a narrowed portion, with the scavenger valve being moveable through the scavenger port between a first position with the first land being seatable in the scavenger port for occluding flow of fluid from the sump through the scavenger port and a second position with flow of fluid being permitted when the narrowed portion is coextensive with the scavenger port; and means for moving the scavenger valve through the scavenger port in response to the pressure of the fluid in the sump of the housing.

7. The self-cleaning filter of claim 6 wherein the occluding means comprises a primary land provided on the scavenger valve, with the narrowed portion being provided between the first land and the primary land, with the primary land being seatable in the scavenger port for preventing flow of fluid from the sump through the scavenger port when the scavenger valve is moved to a third position.

8. The self-cleaning filter of claim 7 wherein the moving means comprises, in combination: a cylinder portion located in the housing; a diaphragm piston reciprocally disposed within the cylinder portion, with the diaphragm piston being driven into the cylinder portion by increasing pressure of the fluid in the sump, with the scavenger valve being attached to the diaphragm piston; and means for biasing the diaphragm piston for movement in a direction out of the cylinder portion.

9. The self-cleaning filter of claim 8 wherein the retaining and backflowing means comprises, in combination: an upper piston reciprocal in response to flow of fluid to be filtered through the inlet port, with the upper piston defining a chamber, with the chamber decreasing in size when the upper piston is reciprocated in response to the subsequent reintroduction of flow of fluid to be filtered into the inlet port to compress the retained residual fluid in the chamber to backflow the residual filtered fluid through the filter medium; and means for biasing the upper piston to increase the size of the chamber when flow of fluid to be filtered through the inlet port is interrupted.

10. The self-cleaning filter of claim 9 wherein the first delaying means comprises, in combination: valving means for admitting fluid to be filtered at a pressure determined by the upper piston biasing means.

11. The self-cleaning filter of claim 10 wherein the valving means comprises, in combination: a space complementary to and for reciprocally receiving the upper piston between a primary position and a secondary position, with the inlet port being in fluid communication with the space; and an escapement slot in fluid communication with the space, with the upper piston occluding the escapement slot in the primary position and with the inlet port and the escapement slot being in fluid communication by the space when the upper piston is in its secondary position.

12. The self-cleaning filter of claim 11 wherein the second delaying means comprises, in combination: at least a first orifice to provide the normal path of filtered fluid to the outlet port from the filter medium; and valve means for blocking fluid flow through the orifice when the flow of the fluid to be filtered is interrupted and for opening the orifice for fluid flow therethrough in response to the pressure of the fluid in the sump of the housing.

13. The self-cleaning filter of claim 12 wherein the valve means comprises, in combination: a valve member slideably disposed relative to the orifice between a primary position occluding fluid flow through the orifice and a secondary position where fluid flow through the orifice is unobstructed, with the valve member being attached to the diaphragm piston.

14. The self-cleaning filter of claim 9 further comprising, in combination: a filter cartridge reciprocally disposed in the housing, with the upper piston being formed on the filter cartridge, with the filter medium being mounted to the filter cartridge.

15. The self-cleaning filter of claim 1 wherein the sump includes a scavenger port, and wherein the purging and occluding means comprises, in combination: a scavenger valve including a first land and a narrowed portion, with the scavenger valve being moveable through the scavenger port between a first position with the first land being seatable in the scavenger port for occluding flow of fluid from the sump through the scavenger port and a second position with flow of fluid being permitted when the narrowed portion is coextensive with the scavenger port; and means for moving the scavenger valve through the scavenger port in response to the pressure of the fluid in the sump of the housing.

16. The self-cleaning filter of claim 15 further comprising, in combination: means for delaying flow from the filter medium to the outlet port.

17. The self-cleaning filter of claim 16 wherein the delaying means comprises, in combination: at least a first orifice to provide the normal path of filtered fluid to the outlet port from the filter medium; and a valve member slideably disposed relative to the orifice between a primary position blocking fluid flow through the orifice and a secondary position where fluid flow through the orifice is unobstructed, with the moving means also moving the valve member in response to the fluid pressure in the sump of the housing.

18. The self-cleaning filter of claim 17 wherein the moving means comprises, in combination: a cylinder portion located in the housing; a diaphragm piston reciprocally disposed within the cylinder portion, with the diaphragm piston being driven into the cylinder portion by increasing pressure of the fluid in the sump, with the scavenger valve and valve member being attached to the diaphragm piston; and means for biasing the diaphragm piston for movement in a direction out of the cylinder portion.

19. A self-cleaning filter including a filter medium between an inlet port for introducing fluid to be filtered and an outlet port for discharging filtered fluid comprising, in combination: a filter cartridge defining a chamber in fluid communication with the outlet port, with the filter medium being mounted on the filter cartridge on the upstream side of the chamber; and means for reciprocating the filter cartridge in response to the flow of fluid to be filtered through the inlet port between a primary position during interruption of flow of fluid to be filtered into the inlet port and a secondary position, with the size of the chamber of the filter cartridge decreasing as the filter cartridge is reciprocated from its primary position to its secondary position, with the residual filtered fluid retained by the chamber on the downstream side of the filter medium backflowing from the downstream side to the upstream side of the filter medium to loosen contaminants from the upstream side of the filter medium as the filter cartridge reciprocates from its primary position to its secondary position in response to subsequent startup of flow of fluid to be filtered into the inlet port.

20. The self-cleaning filter of claim 19 further comprising, in combination: first means for delaying the initiation of flow of fluid to be filtered to the upstream side of the filter medium to allow the residual filtered fluid to flow away from the filter medium.

21. The self-cleaning filter of claim 20 further comprising, in combination: second means for delaying flow from the filter medium to the outlet port.

22. The self-cleaning filter of claim 21 wherein the filter cartridge reciprocating means comprises, in combination: a sleeve in fluid communication with the outlet, with the sleeve including a shoulder, with the filter cartridge having an upper wall for reciprocal receipt on the sleeve and having an inside diameter for reciprocal receipt on the shoulder, with the upper wall of the filter cartridge being positioned adjacent the inlet port to act as a piston to reciprocate the filter cartridge on the sleeve and the shoulder from the primary position to the secondary position in response to the flow of fluid to be filtered through the inlet port, with the chamber being defined by and between the upper wall and the filter cartridge and the sleeve and the shoulder; and means for biasing the filter cartridge from its secondary position to its primary position.

23. The self-cleaning filter of claim 22 wherein the first delaying means comprises, in combination: valving means for admitting fluid to be filtered at a pressure determined by the filter cartridge biasing means.

24. The self-cleaning filter of claim 23 wherein the valving means comprises, in combination: a space complementary to and for reciprocally receiving the filter cartridge between the primary position and the secondary position, with the inlet portion being in fluid communication with the space; and an escapement slot in fluid communication with the space, with the filter cartridge occluding the escapement slot in the primary position and with the inlet port and the escapement slot being in fluid communication by the space when the filter cartridge is in its secondary position.

25. The self-cleaning filter of claim 24 wherein the second delaying means comprises, in combination: at least a first orifice to provide the normal path of filtered fluid to the outlet port from the filter medium; and valve means for blocking fluid flow through the orifice when the flow of the fluid to be filtered is interrupted and for opening the orifice for fluid flow therethrough when fluid to be filtered is pressurized.

26. The self-cleaning filter of claim 25 wherein the valve means comprises, in combination: a valve member slideably disposed relative to the orifice between a primary position occluding fluid flow through the orifice and a secondary position where fluid flow through the orifice is unobstructed; and means for reciprocating the valve member in response to the pressure of the fluid to be filtered.

27. The self-cleaning filter of claim 26 wherein the reciprocating means comprises, in combination: a diaphragm piston reciprocal between a primary position and a secondary position, with fluid pressure reciprocating the diaphragm piston from its primary position to its secondary position; and means for biasing the diaphragm piston from its secondary position to its primary position, with the diaphragm piston being attached to the valve member.

28. The self-cleaning filter of claim 27 wherein the filter medium is located in a housing defining a sump; and wherein the self-cleaning filter further comprises, in combination: means for purging fluid and particulate matter filtered by the filter medium from the sump upon reintroduction of fluid into the inlet port after the flow of fluid has been interrupted and for occluding fluid flow from the sump when the housing has been pressurized by the fluid introduced into the inlet port.

29. The self-cleaning filter of claim 28 wherein the purging and occluding means further comprises means for occluding fluid flow from the sump when the flow of fluid into the inlet port has been terminated such that the housing remains flooded with fluid.

30. The self-cleaning filter of claim 29 wherein the sump includes a scavenger port, and wherein the purging and occluding means comprises, in combination: a scavenger valve including a first land and a narrowed portion, with the scavenger valve being moveable through the scavenger port between a first position with the first land being seatable in the scavenger port for occluding flow of fluid from the sump through the scavenger port and a second position with flow of fluid being permitted when the narrowed portion is coextensive with the scavenger port, with the scavenger valve being attached to the diaphragm piston.

31. The self-cleaning filter of claim 30 wherein the occluding means comprises a primary land provided on the scavenger valve, with the narrowed portion being provided between the first land and the primary land, with the primary land being seatable in the scavenger port for preventing flow of fluid from the sump through the scavenger port when the scavenger valve is moved to a third position.

* * * * *